(12) United States Patent
Yu et al.

(10) Patent No.: US 9,013,986 B2
(45) Date of Patent: Apr. 21, 2015

(54) DEVICE-LEVEL REDUNDANCY PROTECTION METHOD AND SYSTEM BASED ON LINK AGGREGATION CONTROL PROTOCOL

(75) Inventors: Liyuan Yu, Shenzhen (CN); Xiaoxiang Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 112 days.

(21) Appl. No.: 13/885,543

(22) PCT Filed: Dec. 23, 2010

(86) PCT No.: PCT/CN2010/080162
§ 371 (c)(1),
(2), (4) Date: May 15, 2013

(87) PCT Pub. No.: WO2012/065336
PCT Pub. Date: May 24, 2012

(65) Prior Publication Data
US 2013/0229912 A1    Sep. 5, 2013

(30) Foreign Application Priority Data

Nov. 15, 2010    (CN) .......................... 2010 1 0546355

(51) Int. Cl.
*H04L 12/24* (2006.01)
*H04L 12/709* (2013.01)

(52) U.S. Cl.
CPC .......... *H04L 41/0672* (2013.01); *H04L 45/245* (2013.01); *H04L 12/2422* (2013.01); *H04L 41/0654* (2013.01); *H04L 41/0663* (2013.01)

(58) Field of Classification Search
None
See application file for complete search history.

(56) References Cited

U.S. PATENT DOCUMENTS

| | | | |
|---|---|---|---|
| 8,724,456 B1 * | 5/2014 | Hong et al. ................... | 370/225 |
| 2007/0183376 A1 * | 8/2007 | Arai et al. ..................... | 370/338 |
| 2007/0195795 A1 * | 8/2007 | Arai et al. ..................... | 370/396 |
| 2009/0232152 A1 | 9/2009 | Chen | |
| 2011/0286452 A1 * | 11/2011 | Balus et al. ................... | 370/390 |
| 2013/0021903 A1 * | 1/2013 | Li ................................ | 370/228 |
| 2014/0294004 A1 * | 10/2014 | Balus et al. ................... | 370/390 |

FOREIGN PATENT DOCUMENTS

| | | |
|---|---|---|
| CN | 101018228 | 8/2007 |
| WO | 2009155996 | 12/2009 |

OTHER PUBLICATIONS

International Search Report for PCT/CN2010/080162, English Translation attached to original, Both completed by the Chinese Patent Office Aug. 3, 2011, All together 6 Pages.

*Primary Examiner* — Christopher Crutchfield
(74) *Attorney, Agent, or Firm* — Brooks Kushman P.C.

(57) ABSTRACT

A device-level redundancy protection method and system based on Link Aggregation Control Protocol (LACP), wherein the method includes: configuring same parameters for the Link Aggregation Group (LAG) on a first device (LAGP1) and the LAG on a second device (LAGP2), and transmitting an LACP Data Unit (LACPDU) message carrying the parameters to the LAG on a customer edge (LAGC). After receiving the LACPDU message, the LAGC adds physical links respectively connected with the LAGP1 and the LAGP2 into the same Aggregator on the customer edge (AGGC). The LAGP1 and the LAGP2 respectively add physical links connected with the LAGC into the Aggregator of themselves to form a virtual Aggregator (AGGV). The customer edge performs message interactions with a server via the AGGC and AGGV.

11 Claims, 3 Drawing Sheets

DEVICE-LEVEL REDUNDANCY PROTECTION METHOD AND SYSTEM BASED ON LINK AGGREGATION CONTROL PROTOCOL

CROSS-REFERENCE TO RELATED APPLICATION

This application is the U.S. national phase of PCT Application No. PCT/CN2010/080162 filed on Dec. 23, 2010, which claims priority to Chinese Patent Application No. 201010546355.2 filed on Nov. 15, 2010, the disclosures of which are incorporated in their entirety by reference herein.

TECHNICAL FIELD

The present document relates to the data communication field, and in particular, relates to a device level redundancy protection method and system based on link aggregation control protocol (LACP).

BACKGROUND OF THE RELATED ART

With a growth of data traffic and an increase of a service quality requirement, a single physical link in a data link layer cannot satisfy an operating requirement on both the bandwidth and the reliability aspects, while the Link Aggregation Control Protocol (LACP) solved this problem very well. The LACP virtualizes two or more physical links to one logical link, and the logical link, as a whole, is transparently presented to an application of an upper layer. The bandwidth of the logical link is a sum of the bandwidths of all workable physical links. The physical ports which are bound to an identical logical link should have the same Ethernet link layer characteristics, such as a port speed, duplexing, a port state, etc. The advantage of doing it like this is that, when a certain physical link therein is down, that is, fails, the load of the services carried by that physical link can be shared by other physical links. As long as there are certain amounts of available physical links in the logical link, the upper layer service will not be affected. The LACP technology has increased the bandwidth of the link and realized the redundant backup of the link.

Between two interconnected devices, the LACP performs a negotiation through sending the LACP data unit (LACPDU) based on the physical link, wherein, the LACPDU includes the information of the local terminal (Actor) and the opposite terminal (Partner). The LACP runs a standard state machine based on the LACPDU information interacted by the two devices, while it does not run the standard state machine based on commands. The LACP selection state machine selects the physical link according to the local terminal and the opposite terminal information included in the LACPDU.

The LACP selection state machine manages the physical links with the same characteristic parameters through Aggregators, each Link Aggregation Group (abbreviated as LAG) includes at least one Aggregator, each Aggregator has its own characteristic parameters, the characteristic parameters of each Aggregator are different from each other, and the physical link can only be added into an Aggregator with the same characteristic parameters. When the characteristic parameters of a physical link are changed, the physical link must be removed from the current Aggregator, and then be added into an Aggregator with the same characteristic parameters. The selection parameters which influence the full duplex physical link to select the Aggregator include: a system ID of the local terminal (a system priority and a system Media Access Control (MAC) address), an operation KEY of the local terminal, a system ID of the opposite terminal, an operation KEY of the opposite terminal, and a full duplex mode.

The LACP selection state machine compares the system priorities at first, then compares the system MACs, and finally compares the parameters involving the system in the operation KEY value. If the numerical values thereof are different, they cannot be added into an identical Aggregator. As to the identical system, the LACP selection state machine continues to compare the port states or the port parameters of the physical link involved in the operation KEY value, such as the duplex mode and the bandwidth of the physical link. Generally speaking, the physical links of different duplex modes or different bandwidths cannot be added into an identical Aggregator.

The MAC address of the Ethernet device is made up of 6 bytes. The previous 3 bytes are called OUI, which are registered to the network device manufacturer by the IEEE organization, and each manufacturer has one or more sections in the OUI, which differ from each other; the last three bytes are assigned by the network device manufacturer to each device with the MAC address which is produced by their own, which are different from each other.

It is specified in the IEEE802.3AD standard that the butt jointed devices need to be identified by the system ID, the system ID is consisted of the system priority and the system MAC address of the device, and beyond that, the operation KEY value also includes some system information. The information will also influence the selection state machine, and then influence the selection of the device. Different devices are distinguished by different system IDs in the IEEE802.3AD standard.

It is specified in the IEEE802.3AD standard that all the LACPs are configured between two devices, and do not support multi-device aggregation, so the LACP can only perform the physical link level redundant protection or board card level redundant protection, while cannot perform the device level redundant protection.

As shown in FIG. 1, a Customer Edge (CE) is butt jointed with a Provider Edge (PE1) and a PE2 respectively, and interacts with them by adopting the standard LACP. The system MACs of the PE1 and the PE2 are different. An aggregator is formed between the CE and the PE1, and another aggregator is formed between the CE and the PE2. At a certain moment, only one aggregator is in an active state, and another aggregator is in an inactive state. The CE has priority to butt joint with the PE with the higher system ID priority successfully. The PE with the higher system ID priority is an active one and the PE with lower system ID priority is a backup one, to form a traditional LAG dual-machine backup.

Therefore, the limitation about the system ID in the IEEE802.3AD standard results in that, by adopting the traditional LAG dual-machine backup mechanism, at the same moment, only one PE can be aggregated with the CE successfully, and many PEs can not be used for forwarding simultaneously, which reduces the utilization rate of the device; meanwhile, during the time from the PE which performs forwarding becoming abnormal to it switching to other PE and forwarding normally, all flows will be suspended, and the device level redundant ability is bad.

SUMMARY OF THE INVENTION

The objective of the present document is to provide a device level redundant protection method and system based on LACP, wherein many PEs can be aggregated with the CE successfully at the same time, thus increasing a utilization rate of the device and realizing the continuity of the service during the handover.

In order to solve the above technical problem, the present document provides a device level redundant protection method based on a Link Aggregation Control Protocol (LACP), which comprises:

configuring same parameters for a Link Aggregation Group on a first device (LAGP1) and a Link Aggregation Group on a second device (LAGP2), and transmitting an LACP Data Unit (LACPDU) message carrying the parameters to a Link Aggregation Group on a customer edge (LAGC);

after receiving the LACPDU message, the LAGC adding physical links respectively connected with the LAGP1 and the LAGP2 into an identical aggregator on the customer edge (AGGC);

the LAGP1 and the LAGP2 respectively adding physical links connected with the LAGC into respective aggregators to form a virtual aggregator (AGGV); and the customer edge performing a message interaction with a server through the AGGC and the AGGV.

The above method further comprises: after adding physical links respectively connected with the LAGP1 and the LAGP2 into an identical Aggregator on the customer edge (AGGC), the LAGC transmitting a LACPDU message carrying a rack media access control (MAC) of the customer edge to the LAGP1 and the LAGP2.

The LAGP1 and the LAGP2 can respectively add the physical links connected with the LAGC into the respective aggregators to form the virtual aggregator (AGGV) according to the received LACPDU message carrying the rack MAC.

When the first device or the second device becomes abnormal, the customer edge can perform the message interaction with the server through the AGGC and the AGGV.

The parameters can include: a system priority and/or a system MAC.

The parameters can include: physical link operation KEY values of the first device side and the second device side.

The KEY values can include: a port bandwidth and/or a port duplex mode.

In order to solve the above technical problem, the present document further provides a device level redundant protection system based on a Link Aggregation Control Protocol (LACP), comprising: a first device, a second device, a customer edge and a server, wherein, the customer edge connects to the first device and the second device respectively, and the first device and the second device connect with the server respectively, wherein, same parameters are configured for a Link Aggregation Group on the first device (LAGP1) and a Link Aggregation Group on the second device (LAGP2);

the LAGP1 and the LAGP2 are configured to transmit an LACP Data Unit (LACPDU) message carrying the same parameters to a Link Aggregation Group on the customer edge (LAGC) respectively; and add physical links connected with the LAGC into respective aggregators to form a virtual aggregator (AGGV);

the LAGC is configured to, after receiving the LACPDU message, add physical links respectively connected with the LAGP1 and the LAGP2 into an identical aggregator on the customer edge (AGGC); and the customer edge is configured to perform a message interaction with the server through the AGGC and the AGGV.

The LAGC can be further configured to, after adding physical links respectively connected with the LAGP1 and the LAGP2 into the AGGC, transmit a LACPDU message carrying a rack media access control (MAC) of the customer edge to the LAGP1 and the LAGP2; and the LAGP1 and the LAGP2 can be configured to, respectively add the physical links connected with the LAGC into the respective aggregators to form the virtual aggregator (AGGV) only after receiving the LACPDU message carrying the rack MAC of the customer edge.

The parameters can include: a system priority and/or a system MAC.

The parameters can include: physical link operation KEY values of the first device side and the second device side, wherein, the KEY values can include: a port bandwidth and/or a port duplex mode.

The method and system of the present document solve the problem that only one PE can be aggregated with the CE successfully at the same moment while many PEs cannot be used for forwarding at the same time, thus increasing the utilization rate of the device and solving the problem of flow interruption resulted by the handover.

BRIEF DESCRIPTION OF DRAWINGS

The accompanying drawings described herein are used to provide further understanding for the present document and constitute a part of the present application. The illustrated embodiments of the present document and the description thereof are used to explain the present document, rather than constituting an inappropriate limitation to the present document. Wherein.

PREFERRED EMBODIMENTS OF THE INVENTION

Figure 1:
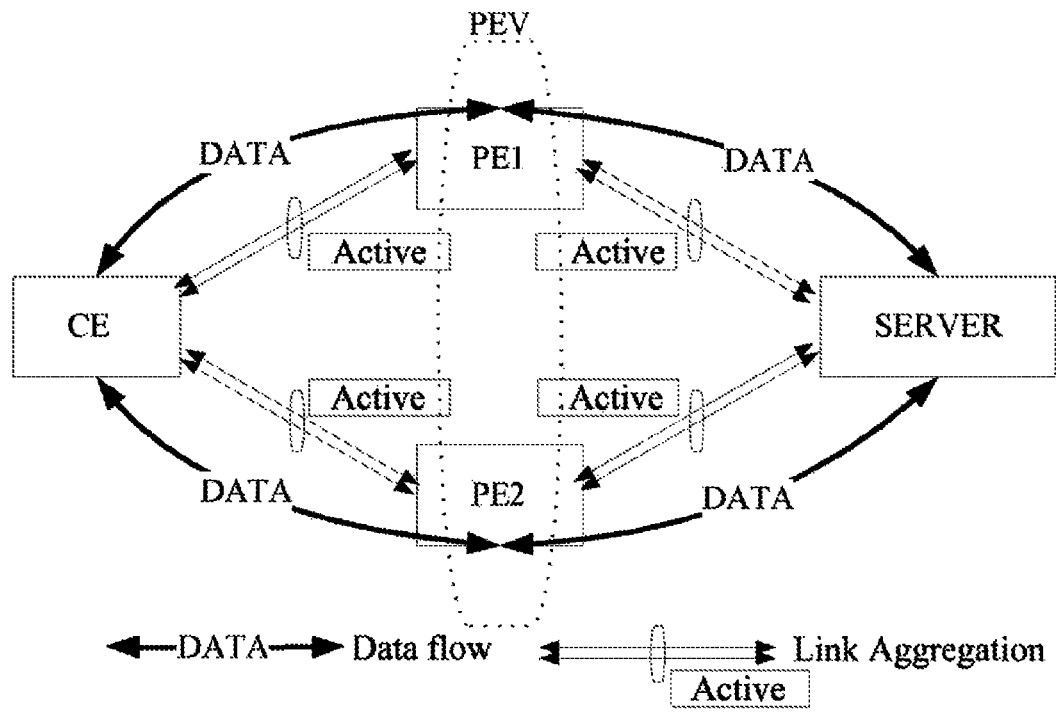
FIG. 1 is a diagram of networking of an application in the present document.

The present document is described in detail with reference to the accompanying drawings and in combination with embodiments hereinafter. It should be illustrated that, in the case of not conflicting, the embodiments in the present application and features in these embodiments can be combined with each other.

In order to be convenient for description, the link aggregation group of the device is called LAGP and the link aggregation group of the customer edge is called LAGC hereinafter.

The technical scheme of the present embodiment includes the following steps:

in step 101, same parameters are configured for a Link Aggregation Group on a first device (LAGP1) and a Link Aggregation Group on a second device (LAGP2), and an LACP Data Unit (LACPDU) message carrying the same parameters is transmitted to a Link Aggregation Group on a customer edge (LAGC);

in step 102, after receiving the LACPDU message, the LAGC adds physical links respectively connected with the LAGP1 and the LAGP2 into an identical aggregator on the customer edge (AGGC); the LAGP1 and the LAGP2 respectively add physical links connected with the LAGC into their respective aggregators to form a virtual aggregator (AGGV); and in step 103, the customer edge performs a message interaction with a server through the AGGC and the AGGV.

The same parameters are configured for the Link Aggregation Group on the first device (LAGP1) and the Link Aggregation Group on the second device (LAGP2);

the Link Aggregation Group on the first device or the second device transmits the same parameters to the Link Aggregation Group on the customer edge (LAGC);

the LAGC adds the physical links respectively connected with the LAGP1 and the LAGP2 into the identical aggregator on the customer edge (AGGC); the LAGP1 and the LAGP2 respectively add the physical links connected with the LAGC into their respective aggregators to form the virtual aggregator (AGGV); and the customer edge performs a message interaction with the server through the AGGC and the AGGV.

The technical scheme of the present embodiment further includes: after the LAGC adds the physical links respectively connected with the LAGP1 and the LAGP2 into the identical Aggregator on the customer edge (AGGC), the LAGC transmitting the LACPDU message carrying the rack MAC of the customer edge, that is, MACC, to the LAGP1 and the LAGP2.

The technical scheme of the present embodiment further includes: the LAGP1 and the LAGP2 respectively adding the physical links connected with the LAGC into their respective aggregators to form the virtual aggregator (AGGV) according to the received LACPDU message carrying the MACC.

The technical scheme of the present embodiment further includes: when the first device or the second device becomes abnormal, the customer edge performing the message interaction with the server through the AGGC and the AGGV.

The technical scheme of the present embodiment further includes: said same parameters including any one or any combination of the follows: a system priority, a system MAC.

The technical scheme of the present embodiment further includes: the same configuration parameters including: physical link operation KEY values in the first device side and the second device side.

The technical scheme of the present embodiment further includes: the KEY values including any one or any combination of the follows: a port bandwidth, a port duplex mode.

The technical scheme of the present embodiment includes: a first device, a second device, a customer edge and a server, wherein, the customer edge connects to the first device and the second device respectively, and the first device and the second device connect with the server respectively, and, The same parameters are configured for the Link Aggregation Group on the first device (LAGP1) and the Link Aggregation Group on the second device (LAGP2);

the LAGP1 and the LAGP2 are configured to transmit an LACP Data Unit (LACPDU) message carrying the same parameters to a Link Aggregation Group on the customer edge (LAGC); and add physical links connected with the LAGC into their respective aggregators to form a virtual aggregator (AGGV);

the LAGC is configured to, after receiving the LACPDU message, add physical links respectively connected with the LAGP1 and the LAGP2 into an identical aggregator on the customer edge (AGGC); and the customer edge is configured to perform a message interaction with the server through the AGGC and the AGGV.

The technical scheme of the present embodiment further includes that: the LAGC is further configured to, after adding the physical links respectively connected with the LAGP1 and the LAGP2 into the AGGC, transmit a LACPDU message carrying a rack MAC of the customer edge to the LAGP1 and the LAGP2; and the LAGP1 and the LAGP2 are configured to, respectively add the physical links connected with the LAGC into their respective aggregators to form the virtual aggregator (AGGV) only after receiving the LACPDU message carrying the rack MAC of the customer edge.

The technical scheme of the present embodiment further includes: the parameters including any one or any combination of the follows: a system priority, a system MAC.

The technical scheme of the present embodiment further includes: the parameters including: physical link operation KEY values of the first device side and the second device side, wherein, the physical link operation KEY values include any one or any combination of the follows: a port bandwidth, a port duplex mode.

FIG. 1 is a diagram of networking of an application in the present document; as shown in FIG. 1: the device CE connects with the devices PE1 and PE2 respectively, and the server (SERVER) connects with the devices PE1 and PE2 respectively. When the data flow between the CE and the SERVER passes through the PE1 and the PE2 at the same time, it is received and forwarded according to a load sharing mode. Part of the flow is forwarded through the upper route (CE---PE1---SERVER); and part of the flow are forwarded through the below route (CE---PE2---SERVER). When the device PE1 (or PE2) breaks down, the CE and the SERVER recalculate the load sharing, and the flow are forwarded through the PE2 (or the PE1). The device level redundancy protection of the LACP is realized effectively in this way. Certainly, in the actual networking, the number of devices on the PE side may be not only two, and n PEs (PE1-PEn) can be configured (n is not more than the number of the maximum configurable physical links of the Link Aggregation Group), but such a networking is relatively complicated, and needs to be balanced carefully.

Figure 2:
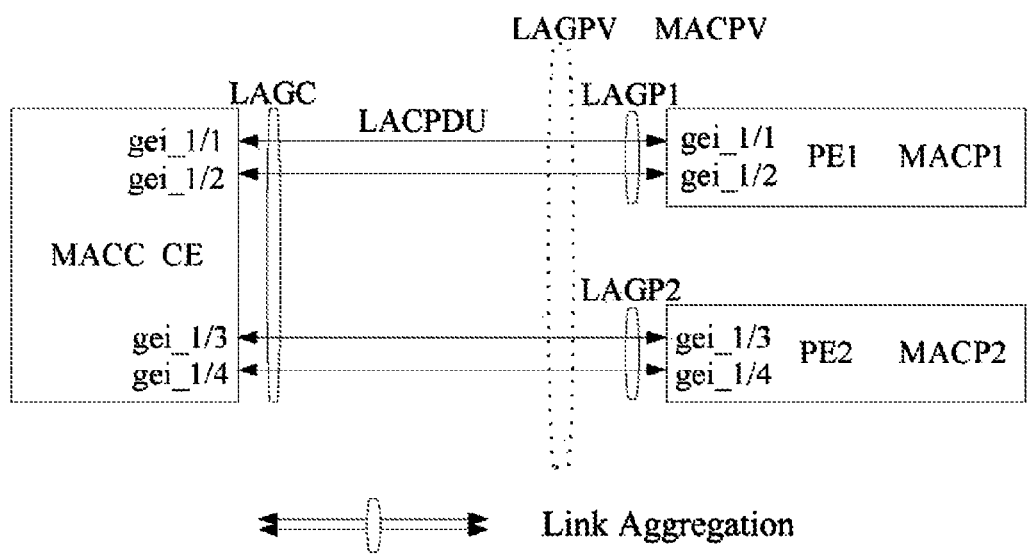
FIG. 2 is a diagram of a configuration of applying three devices for networking in the present document.

FIG. 2 is a diagram of a configuration of applying three devices for networking in the present document. The rack MAC of the device CE is MACC, the four ports gei_1/1, gei_1/2, gei_1/3 and gei_1/4 on the device CE are bound to the Link Aggregation Group (LAGC); the rack MAC of the device PE1 is MACP1, and the two ports gei_1/1 and gei_1/2 on the device PE1 are bound to the Link Aggregation Group (LAGP1); the rack MAC of the device PE2 is MACP2, and the two ports gei_1/3 and gei_1/4 on the device PE2 are bound to the Link Aggregation Group (LAGP2). The Link Aggregation Group of the device CE (LAGC) adopts the MACC of the rack by default; the MAC of the Link Aggregation Group on the device PE1 (LAGP1) is configured as MACPV; and the MAC of the Link Aggregation Group on the device PE2 (LAGP2) is configured as MACPV.

All the three racks run the standard LACP protocol. For the PE1 (or PE2), the PE1 (or PE2) only performs a direct butted joint of the two devices with the CE, and the PE1 (or PE2) cannot experience that there is a PE2 (or PE1); the LAGP1 and the LAGP2 use the same MACPV to perform the LACPDU message (including the MACPV) interaction with the LAGC. For the CE, the PE1 and the PE2 are the identical device PEV. Certainly, in order to virtualize the LAGP1 and the LAGP2 as the LAGPV, besides configuring the system MAC as the same, the LAGP1 and the LAGP2 also are required to ensure other parameters, which influence adding the physical link of the CE side into the identical Aggregator, to be the same.

Figure 3:
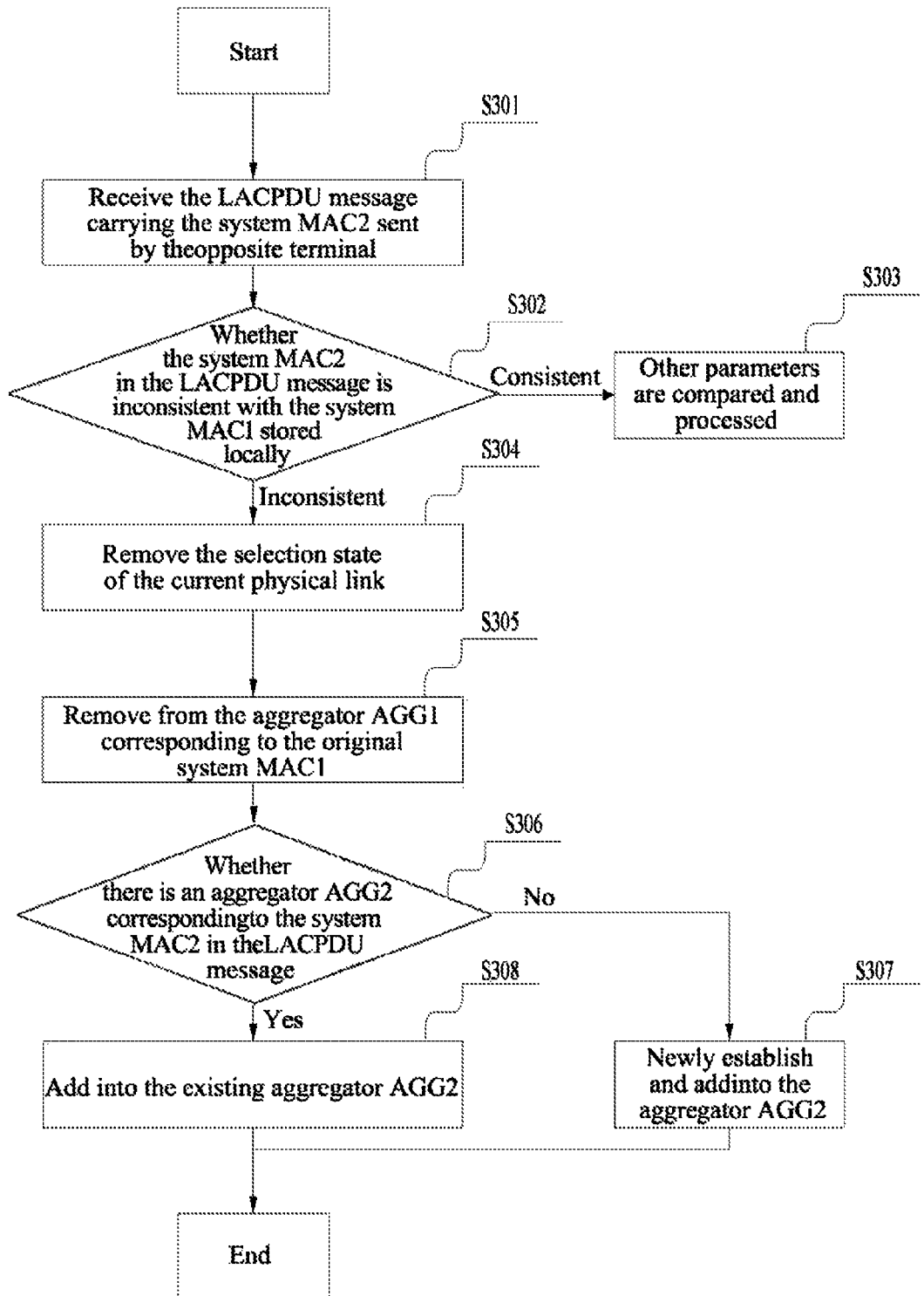
FIG. 3 is a flow chart of selecting an aggregator of a physical link in the present document.

FIG. 3 is a flow chart of selecting an aggregator of a physical link in the present document; it can be seen from the following specific steps, as long as the characteristic parameters of the local terminals and the opposite terminals of all physical links keep the same, finally all physical links will be added into an identical aggregator. The aggregator selection flow of the physical link is explained taking the processing flow of the system MAC as an example hereinafter. The specific steps are as follows:

in step S301, a receiving state machine receives the LACPDU message carrying the system MAC2 sent by the opposite terminal;

in step S302, the receiving state machine judges whether the system MAC2 in the current LACPDU message is inconsistent with the system MAC1 stored locally; if being consistent, it goes to step S303, if being inconsistent, it goes to step S304;

in step S303, other parameters are compared and processed, the processing way is similar with that of comparing the system MAC;

in step S304, the receiving state machine changes the selection state of the current physical link over which the message is received, the selection state of the physical link turns from SELECTED into UNSELECTED;

in step S305, the selection state machine reselect an aggregator according to the opposite terminal information of the current physical link carried in the received LACPDU message, and at first, the physical link is removed from the aggregator AGG1 corresponding to the original system MAC1;

in step S306, the selection state machine judges whether there is an aggregator AGG2 corresponding to the system MAC2 in the LACPDU message; if not, it goes to step S307; if yes, it goes to step S308;

in step S307, the selection state machine newly establishes an aggregator AGG2 and adds the current physical link carried in the received LACPDU message into the aggregator AGG2, and the selection state of the physical link turns from UNSELECTED into SELECTED;

in step S308, the selection state machine adds the current physical link carried in the received LACPDU message into the existing aggregator AGG2, and the selection state of the physical link turns from UNSELECTED into SELECTED.

Figure 4:
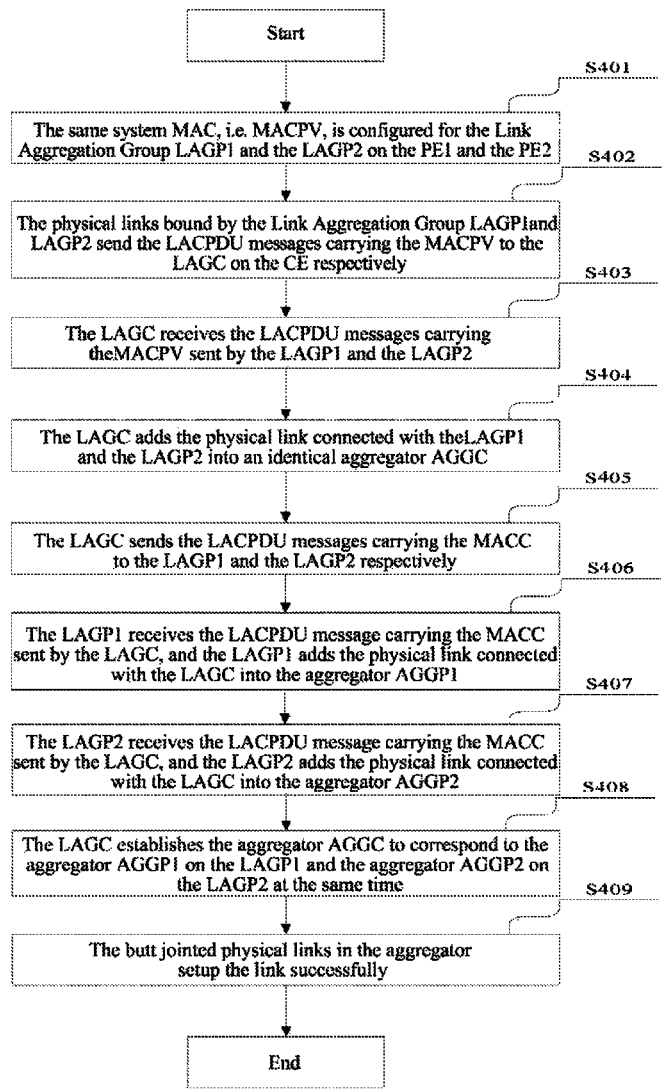
FIG. 4 is a flow chart of configuring and validating system MAC in the present document.

FIG. 4 is a flow chart of configuring and validating system MAC in the present document. The specific steps are as follows:

in step S401, the same system MAC, i.e. MACPV, is configured for the Link Aggregation Group LAGP1 and the LAGP2 on the PE1 and the PE2;

in step S402, the physical links bound by the Link Aggregation Group LAGP1 and LAGP2 send the LACPDU messages carrying the MACPV to the Link Aggregation Group on the CE (LAGC) respectively;

in step S403, the LAGC receives the LACPDU messages carrying the MACPV sent by the LAGP1 and the LAGP2;

in step S404, the LAGC adds the physical link connected with the LAGP1 and the LAGP2 into an identical aggregator AGGC;

in step S405, the LAGC sends the LACPDU messages carrying the MACC to the LAGP1 and the LAGP2 respectively;

in step S406, the LAGP1 receives the LACPDU message carrying the MACC sent by the LAGC, and the LAGP1 adds the physical link connected with the LAGC into the aggregator AGGP1;

in step S407, the LAGP2 receives the LACPDU message carrying the MACC sent by the LAGC, and the LAGP2 adds the physical link connected with the LAGC into the aggregator AGGP2;

in step S408, the LAGC establishes the aggregator AGGC to correspond to the aggregator AGGP1 on the LAGP1 and the aggregator AGGP2 on the LAGP2 at the same time;

in step S409, the butt jointed physical links in the aggregator setup the link successfully.

In conclusion, in the present document, on the basis of following the standard LACP protocol, by configuring the same parameters, two devices are virtualized into one device. In the present document, no extra cost needs to be increased, and it has the characteristics of operating simply, implementing easily, running stably, and being compatible with the standard LACP protocol at the same time, and the device level redundancy protection of the LACP is effectively realized.

Certainly, in order to virtualize the Link Aggregation Groups on two or more devices as a Link Aggregation Group on one device, the present document also can have many kinds of other combinations. The above description is only the preferred embodiments of the present document and is not intended to limit the present document. For those skilled in the art, the present document can have various modifications and variations. All of modifications, equivalents and/or improvements without departing from the spirit and essence of the present document should be embodied in the protection scope of the present document.

INDUSTRIAL APPLICABILITY

Compared with the related art, the present document solves the problem that only one PE can be aggregated with the CE successfully at the same moment while many PEs cannot be used for forwarding simultaneously, thus increasing the utilization rate of the device and solving the problem of the flow interruption resulted by the handover.

What we claim is:

1. A device level redundant protection method based on a Link Aggregation Control Protocol (LACP), comprising:
    configuring same parameters for a first Link Aggregation Group (LAGP1) on a first device and a second Link Aggregation Group (LAGP2) on a second device, and transmitting an LACP Data Unit (LACPDU) message carrying the parameters to a Link Aggregation Group on a customer edge (LAGC);
    after receiving the LACPDU message, the LAGC adding physical links respectively connected with the LAGP1 and the LAGP2 into an identical aggregator on the customer edge (AGGC);
    the LAGP1 and the LAGP2 respectively adding physical links connected with the LAGC into respective aggregators to form a virtual aggregator (AGGV); and
    the customer edge performing a message interaction with a server through the AGGC and the AGGV.

2. The method according to claim 1, after the step of the LAGC adding physical links respectively connected with the LAGP1 and the LAGP2 into an identical Aggregator on the customer edge (AGGC), further comprising:
    the LAGC transmitting a LACPDU message carrying a rack media access control (MAC) of the customer edge to the LAGP1 and the LAGP2.

3. The method according to claim 2, wherein,
    in the step of the LAGP1 and the LAGP2 respectively adding physical links connected with the LAGC into respective aggregators, the LAGP1 and the LAGP2 respectively add the physical links connected with the LAGC into the respective aggregators to form the virtual aggregator (AGGV) only after receiving the LACPDU message carrying the rack MAC of the customer edge.

4. The method according to claim 1, wherein, the step of the customer edge performing a message interaction with a server through the AGGC and the AGGV comprises:

when the first device or the second device becomes abnormal, the customer edge performing the message interaction with the server through the AGGC and the AGGV.

5. The method according to claim 1, wherein, the parameters include: a system priority and/or a system MAC.

6. The method according to claim 1, wherein, the parameters include: physical link operation KEY values of the first device side and the second device side.

7. The method according to claim 6, wherein, the physical link operation KEY values include: a port bandwidth and/or a port duplex mode.

8. A device level redundant protection system based on a Link Aggregation Control Protocol (LACP), comprising: a first device, a second device, a customer edge and a server, wherein, the customer edge connects to the first device and the second device respectively, and the first device and the second device connect with the server respectively, wherein, the first device comprises at least one processor executing a first Link Aggregation Group (LAGP1), and the second device comprises at least one processor executing a second Link Aggregation Group (LAGP2); the customer edge comprises at least one processor executing a Link Aggregation Group on the customer edge (LAGC);

same parameters are configured for the LAGP1 and the LAGP2;

the LAGP1 and the LAGP2 are configured to transmit an LACP Data Unit (LACPDU) message carrying the same parameters to the LAGC respectively; and respectively add physical links connected with the LAGC into respective aggregators to form a virtual aggregator (AGGV);

the LAGC is configured to, after receiving the LACPDU message, add physical links respectively connected with the LAGP1 and the LAGP2 into an identical aggregator on the customer edge (AGGC); and the customer edge further comprises at least one processor which is configured to perform a message interaction with the server through the AGGC and the AGGV.

9. The system according to claim 8, wherein, the LAGC is further configured to, after adding physical links respectively connected with the LAGP1 and the LAGP2 into the AGGC, transmit a LACPDU message carrying a rack media access control (MAC) of the customer edge to the LAGP1 and the LAGP2; and the LAGP1 and the LAGP2 are configured to, respectively add the physical links connected with the LAGC into the respective aggregators to form the virtual aggregator (AGGV) only after receiving the LACPDU message carrying the rack MAC of the customer edge.

10. The system according to claim 8, wherein, the parameters include: a system priority and/or a system MAC.

11. The system according to claim 8, wherein, the parameters include: physical link operation KEY values of the first device side and the second device side, wherein, the physical link operation KEY values include: a port bandwidth and/or a port duplex mode.

* * * * *